(12) United States Patent
Gaug (10) Patent No.: US 7,684,421 B2
(45) Date of Patent: Mar. 23, 2010

(54) INFORMATION ROUTING IN A DISTRIBUTED ENVIRONMENT

(75) Inventor: Mark Gaug, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 763 days.

(21) Appl. No.: 11/449,753

(22) Filed: Jun. 9, 2006

(65) Prior Publication Data
US 2007/0011349 A1    Jan. 11, 2007

Related U.S. Application Data (60) Provisional application No. 60/688,725, filed on Jun. 9, 2005, provisional application No. 60/688,724, filed on Jun. 9, 2005.

(51) Int. Cl.
*H04L 12/28* (2006.01)
(52) U.S. Cl. .................. 370/408; 370/422; 370/389; 370/392
(58) Field of Classification Search ............ 370/252, 370/408, 422, 389, 392, 255
See application file for complete search history.

(56) References Cited

U.S. PATENT DOCUMENTS

| | | | |
|---|---|---|---|
| 3,666,073 | A | 5/1972 | Lings et al. |
| 3,678,278 | A | 7/1972 | Peil |
| 3,695,462 | A | 10/1972 | Sullivan |
| 3,735,853 | A | 5/1973 | Lingg et al. |
| 3,776,395 | A | 12/1973 | Lilngg et al. |
| 4,137,567 | A | 1/1979 | Grube |
| 4,210,811 | A | 7/1980 | Dennhoven et al. |
| 4,239,434 | A | 12/1980 | Gannon |
| 4,416,435 | A | 11/1983 | Szendrodi et al. |
| 4,604,704 | A | 8/1986 | Eaves et al. |

(Continued)

FOREIGN PATENT DOCUMENTS

CA    2443469    10/2002

(Continued)

OTHER PUBLICATIONS

U.S. Appl. No. 10/837,648, Final Office Action dated Apr. 21, 2008.

(Continued)

*Primary Examiner*—Ricky Q. Ngo
*Assistant Examiner*—Dewanda Samuel
(74) *Attorney, Agent, or Firm*—Miles & Stockbridge PC; James T. Carmichael; Stephen W. Aycock, II (57) ABSTRACT

An information management system for a device network is disclosed. The information management system may include a service requester node, a monitoring node, and a service provider node. The system may include a service oriented request message including a message header, having a list of destination nodes, including the service provider node, to which the service oriented request message is addressed, and a service request. The system may include a routing module disposed in the monitoring node and configured to analyze the list of destination nodes in the message, create a modified message including at least one child node selected from the service provider nodes based on a fan-out of the device network, and forward the modified message to the at least one child node, the modified message including a message header, having an updated list of one or more destination nodes, including the service provider nodes, to which the modified message is addressed, and the service request. The routing module may be configured to receive a response to the service request from the at least one child node, aggregate the response received into a single message, and send the single message to a parent node in the device network.

7 Claims, 8 Drawing Sheets

U.S. PATENT DOCUMENTS

| | | | |
|---|---|---|---|
| 4,634,849 A | 1/1987 | Klingen | |
| 4,879,735 A | 11/1989 | Owens | |
| 5,153,439 A | 10/1992 | Gozani et al. | |
| 5,182,764 A | 1/1993 | Peschmann et al. | |
| 5,363,951 A | 11/1994 | Mensch | |
| 5,367,552 A | 11/1994 | Perschmann | |
| 5,373,538 A | 12/1994 | Grenier et al. | |
| 5,479,023 A | 12/1995 | Bartle | |
| 5,490,218 A | 2/1996 | Krug et al. | |
| 5,600,303 A | 2/1997 | Husseiny et al. | |
| 5,600,700 A | 2/1997 | Krug et al. | |
| 5,642,393 A | 6/1997 | Krug et al. | |
| 5,692,029 A | 11/1997 | Husseiny et al. | |
| 5,793,639 A | 8/1998 | Yamazaki | |
| 5,796,802 A | 8/1998 | Gordon | |
| 5,802,289 A | 9/1998 | Oprescu | |
| 5,838,758 A | 11/1998 | Krug et al. | |
| 5,870,449 A | 2/1999 | Lee et al. | |
| 5,910,973 A | 6/1999 | Grodzins | |
| 5,920,053 A | 7/1999 | DeBrouse | |
| 5,949,842 A | 9/1999 | Schafer et al. | |
| 5,970,113 A | 10/1999 | Crawford et al. | |
| 5,974,111 A | 10/1999 | Krug et al. | |
| 5,991,764 A | 11/1999 | Sundaresan | |
| 6,014,628 A | 1/2000 | Kovarik, Jr. | |
| 6,018,562 A | 1/2000 | Willson | |
| 6,044,353 A | 3/2000 | Pugliese, III | |
| 6,088,423 A | 7/2000 | Krug et al. | |
| 6,145,653 A | 11/2000 | Mensch | |
| 6,158,658 A | 12/2000 | Barclay | |
| 6,218,943 B1 | 4/2001 | Ellenbogen | |
| 6,222,452 B1 | 4/2001 | Ahlstrom et al. | |
| 6,230,043 B1 | 5/2001 | Johnson | |
| 6,256,404 B1 | 7/2001 | Gordon et al. | |
| 6,283,260 B1 | 9/2001 | Yasuda, Sr. | |
| 6,335,688 B1 | 1/2002 | Sweatte | |
| 6,335,960 B2 | 1/2002 | Knigge et al. | |
| 6,345,113 B1 | 2/2002 | Crawford et al. | |
| 6,359,886 B1 | 3/2002 | Ujihara et al. | |
| 6,265,977 B1 | 4/2002 | Caplan | |
| 6,364,365 B1 | 4/2002 | Caplan | |
| 6,370,222 B1 | 4/2002 | Cornick, Jr. | |
| 6,460,681 B1 | 10/2002 | Coutant et al. | |
| 6,471,039 B1 | 10/2002 | Bruun et al. | |
| 6,472,984 B1 | 10/2002 | Risi | |
| 6,507,278 B1 | 1/2003 | Brunetti et al. | |
| 6,512,964 B1 | 1/2003 | Quackenbush et al. | |
| 6,546,072 B1 | 4/2003 | Chalmers | |
| 6,580,778 B2 | 6/2003 | Meder | |
| 6,594,547 B2 | 7/2003 | Manabe et al. | |
| 6,637,563 B1 | 10/2003 | Ruckh | |
| 6,650,729 B2 | 11/2003 | Braess et al. | |
| 6,668,990 B2 | 12/2003 | Humiston, Jr. | |
| 6,707,879 B2 | 3/2004 | McClelland et al. | |
| 6,721,391 B2 | 4/2004 | McClelland et al. | |
| 6,757,714 B1 | 6/2004 | Hansen | |
| 6,789,660 B1 | 9/2004 | Brunn et al. | |
| 6,791,487 B1 | 9/2004 | Singh et al. | |
| 6,922,460 B2 | 7/2005 | Skatter et al. | |
| 6,946,300 B2 | 9/2005 | Nguyen et al. | |
| 6,952,163 B2 | 10/2005 | Huey et al. | |
| 6,965,816 B2 | 11/2005 | Walker | |
| 6,970,088 B2 | 11/2005 | Kovach | |
| 6,982,960 B2 | 1/2006 | Lee et al. | |
| 7,027,773 B1 | 4/2006 | McMillin | |
| 7,046,134 B2 | 5/2006 | Hansen | |
| 7,082,460 B2 | 7/2006 | Hansen et al. | |
| 7,106,826 B2 | 9/2006 | Poteet et al. | |
| 7,116,751 B2 | 10/2006 | Ellenbogen et al. | |
| 7,117,239 B1 | 10/2006 | Hansen | |
| 7,134,075 B2 * | 11/2006 | Hind et al. | 715/239 |
| 7,139,406 B2 * | 11/2006 | McClelland et al. | 382/100 |
| 7,143,139 B2 * | 11/2006 | Burbeck et al. | 709/206 |
| 7,177,929 B2 * | 2/2007 | Burbeck et al. | 709/224 |
| 7,183,906 B2 | 2/2007 | Zanovitch et al. | |
| 7,212,113 B2 | 5/2007 | Zanovitch | |
| 7,270,227 B2 | 9/2007 | Bender et al. | |
| 7,317,390 B2 | 1/2008 | Huey et al. | |
| 7,366,113 B1 * | 4/2008 | Chandra et al. | 370/255 |
| 7,483,994 B1 * | 1/2009 | Stephens et al. | 709/230 |
| 2001/0015380 A1 | 8/2001 | Good et al. | |
| 2001/0032034 A1 | 10/2001 | Manabe et al. | |
| 2002/0040928 A1 | 4/2002 | Jalili et al. | |
| 2002/0069293 A1 | 6/2002 | Natalio | |
| 2002/0107714 A1 | 8/2002 | Whitlock et al. | |
| 2002/0116550 A1 | 8/2002 | Hansen | |
| 2002/0134836 A1 | 9/2002 | Cash et al. | |
| 2002/0172324 A1 | 11/2002 | Ellengogen | |
| 2002/0176531 A1 | 11/2002 | McClelland et al. | |
| 2002/0176532 A1 | 11/2002 | McClelland et al. | |
| 2002/0185358 A1 | 12/2002 | Zeitler et al. | |
| 2002/0186862 A1 | 12/2002 | McClelland et al. | |
| 2002/0191739 A1 | 12/2002 | Allen et al. | |
| 2002/0198731 A1 | 12/2002 | Barnes et al. | |
| 2003/0023592 A1 | 1/2003 | Modica et al. | |
| 2003/0085163 A1 | 5/2003 | Chan et al. | |
| 2003/0085281 A1 | 5/2003 | Knowles et al. | |
| 2003/0100973 A1 | 5/2003 | Quackenbush et al. | |
| 2003/0115340 A1 | 6/2003 | Sagula et al. | |
| 2003/0118151 A1 | 6/2003 | Menhardt | |
| 2003/0127511 A1 | 7/2003 | Kelly et al. | |
| 2003/0128100 A1 | 7/2003 | Burkhardt et al. | |
| 2003/0128806 A1 | 7/2003 | Morrell | |
| 2003/0137415 A1 | 7/2003 | Thomson | |
| 2003/0141411 A1 | 7/2003 | Pandya et al. | |
| 2003/0147484 A1 | 8/2003 | Olshansky et al. | |
| 2003/0152186 A1 | 8/2003 | Jurczyk et al. | |
| 2003/0156679 A1 | 8/2003 | Mori et al. | |
| 2003/0185340 A1 | 10/2003 | Frantz | |
| 2003/0189094 A1 | 10/2003 | Trabitz | |
| 2003/0200285 A1 | 10/2003 | Hansen et al. | |
| 2003/0200349 A1 | 10/2003 | Hansen | |
| 2003/0214583 A1 | 11/2003 | Sadok | |
| 2003/0225894 A1 * | 12/2003 | Ito | 709/227 |
| 2004/0001568 A1 | 1/2004 | Impson et al. | |
| 2004/0010697 A1 | 1/2004 | White | |
| 2004/0017887 A1 | 1/2004 | Le et al. | |
| 2004/0021572 A1 | 2/2004 | Schoen et al. | |
| 2004/0027376 A1 | 2/2004 | Calder et al. | |
| 2004/0036623 A1 | 2/2004 | Chung | |
| 2004/0041706 A1 | 3/2004 | Stratmoen et al. | |
| 2004/0054550 A1 | 3/2004 | Cole et al. | |
| 2004/0120454 A1 | 6/2004 | Ellenbogen et al. | |
| 2004/0148571 A1 | 7/2004 | Lue | |
| 2004/0177124 A1 | 9/2004 | Hansen | |
| 2004/0212492 A1 | 10/2004 | Boesch et al. | |
| 2004/0252024 A1 | 12/2004 | Huey et al. | |
| 2005/0024199 A1 | 2/2005 | Huey et al. | |
| 2005/0027871 A1 * | 2/2005 | Bradley et al. | 709/227 |
| 2005/0028091 A1 | 2/2005 | Bordawekar et al. | |
| 2005/0031076 A1 | 2/2005 | McClelland et al. | |
| 2005/0036470 A1 | 2/2005 | Calvert | |
| 2005/0044197 A1 * | 2/2005 | Lai | 709/223 |
| 2005/0110672 A1 | 5/2005 | Cardiasmenos et al. | |
| 2005/0152286 A1 * | 7/2005 | Betts et al. | 370/255 |
| 2005/0190061 A1 | 9/2005 | Trela | |
| 2005/0206514 A1 | 9/2005 | Zanovitch et al. | |
| 2005/0237180 A9 | 10/2005 | Boesch et al. | |
| 2005/0238232 A1 | 10/2005 | Ying et al. | |
| 2005/0242168 A1 | 11/2005 | Tsevas et al. | |
| 2005/0248450 A1 | 11/2005 | Zanovitch | |
| 2005/0251397 A1 | 11/2005 | Zanovitch et al. | |
| 2005/0251398 A1 | 11/2005 | Zanovitch et al. | |
| 2006/0208871 A1 | 9/2006 | Hansen | |

| | | | |
|---|---|---|---|
| 2006/0255929 | A1 | 11/2006 | Zanovitch |
| 2006/0282886 | A1 | 12/2006 | Gaug |
| 2007/0011349 | A1 | 1/2007 | Gaug |

FOREIGN PATENT DOCUMENTS

| | | |
|---|---|---|
| CN | 1428718 | 7/2003 |
| DE | 4210516 | 10/1993 |
| EP | 0 459 648 A1 | 12/1991 |
| JP | 6075978 | 3/1994 |
| JP | 2002 292372 A | 10/2000 |
| JP | 2003 122879 A | 4/2003 |
| WO | WO 90/12660 | 11/1990 |
| WO | WO 02/082290 A2 | 10/2002 |
| WO | WO 03/029844 A2 | 4/2003 |

OTHER PUBLICATIONS

U.S. Appl. No. 10/837,759, Final Office Action dated May 6, 2008.
U.S. Appl. No. 10/837,648, Office Action dated Oct. 3, 2008.
Hi-Scan 6040i/7555i "X-ray Inspection Systems".
Information Technology for Counterterrorism, Box 3.7, "Scenarios for Automated Evidence Combination" 4 pages.
Tony Lee Orrd, "Is That A Gun Or Just A Security Test?" Government Computer News/GCN.com, Jun. 5, 2000, vol. 19, No. 14, p. 1-3.
Affidavit of Joseph P. Zanovitch.
Robert J. Edley, "Hold Baggage Screening Systems" Airport International, pp. 1-6.
L-3 Communications Security & Detection Systems, L-3 Communications Secures Poland's First HBS Systems Award—Total Contract Valued at Approx. $1 Million, Airport International, pp. 1-2.
Bill Mawer, "Security Net—The Shape of Things to Come" Airporpt International, pp. 1-7.
Rapiscan, "Rapiscan Advanced Technologies" pp. 1-2.
Rapiscan 515, "X-Ray Screening System", pp. 1-2.
Rapiscan 519, "Advanced Portable X-Ray System", pp. 1-2.
Rapiscan 520B, "X-Ray Screening System", pp. 1-2.
Rapiscan 522B, pp. 1-2.
Rapiscan 524, "X-Ray Screening System", pp. 1-2.
Rapiscan 526, "X-Ray Screening System", pp. 1-2.
Rapiscan 527, "X-Ray Screening System", pp. 1-2.
Rapiscan 532H, pp. 1-2.
U.S. Appl. No. 10/971,021, filed Oct. 25, 2004, Bender et al.
U.S. Appl. No. 11/619,207, filed Mar. 26, 2007, Zanovitch.
U.S. Appl. No. 11/530,378, filed Sep. 8, 2006, Bender et al.
Notice of Allowance dated Jun. 23, 2006 for U.S. Appl. No. 10/804,088.
Notice of Allowance dated Mar. 12, 2006 for U.S. Appl. No. 10/971,021.
Notice of Allowance dated Mar. 5, 2007 for U.S. Appl. No. 10/837,645.
U.S. Appl. No. 10/837,648, Office Action dated Sep. 11, 2007.
U.S. Appl. No. 11/493,012, Office Action dated Oct. 3, 2007.
U.S. Appl. No. 10/837,759, Office Action dated Oct. 4, 2007.
U.S. Appl. No. 11/691,207, Office Action dated Aug. 26, 2008.
U.S. Appl. No. 10/837,759, Office Action dated Jan. 9, 2009.
Notice of Allowance dated Dec. 19, 2008 for U.S. Appl. No. 11/530,378.
Notice of Allowance dated Jan. 2, 2009 for U.S. Appl. No. 11/691,207.
Notice of Allowance dated Apr. 20, 2009 for U.S. Appl. No. 11/493,012.

* cited by examiner

```
1   <?xml version="1.0" encoding="utf-8"?>
2   <soap:Envelope xmlns:soap="http://schemas.xmlsoap.org/soap/envelope/" xmlns:xsi="http://www.w3.org/2001/XMLSchema-instance" xmlns:xsd="
    http://www.w3.org/2001/XMLSchema">
3     <soap:Body>
4       <ScannerDataRequest xmlns="http://stip.tsa.gov/DAGWebService/">
5         <DATA_REQUEST xmlns="http://stip.tsa.gov/DAGWebService/">
6           <HEADER>
7             <NodeList>
8               <NODE ID="LAX C1G3X1"/>
9               <NODE ID="LAX C1G4X1"/>
10              <NODE ID="LAX C1G4X3"/>
11              <NODE ID="LAX C1G5X1"/>
12              <NODE ID="LAX C1s1"/>
13              <NODE ID="LAX C1s2"/>
14              <NODE ID="LAX C1s3"/>
15              <NODE ID="PIT CMG1X1"/>
16              <NODE ID="PIT CMG2X1"/>
17              <NODE ID="PIT CMG3X1"/>
18              <NODE ID="PIT CMG4X1"/>
19              <NODE ID="PIT CMs1"/>
20              <NODE ID="PIT CMs2"/>
21              <NODE ID="PIT CMk1"/>
22              <NODE ID="PIT CMk2"/>
23            </NodeList>
24          </HEADER>
25          <REQUEST>
26            <THROUGHPUT DATE="05/01/2006" MTYPE="DAILY"/>
27          </REQUEST>
28        </DATA_REQUEST>
29      </ScannerTypeRequest>
30    </soap:Body>
31  </soap:Envelope>
```

Fig. 8

INFORMATION ROUTING IN A DISTRIBUTED ENVIRONMENT

The present application claims priority under 35 U.S.C. § 119(e) to U.S. Provisional Application No. 60/688,725, entitled "Centralized Security Equipment Management Utilizing a Service Oriented Architecture (SOA)", filed Jun. 9, 2005, and U.S. Provisional Application No. 60/688,724, entitled "Information Routing In A Distributed Environment", filed Jun. 9, 2005 both of which are incorporated herein by reference in their entirety.

An exemplary embodiment of the invention relates to information management. More specifically, an exemplary embodiment is directed toward message dissemination and response management in a distributed computerized network.

Currently web service messages may be used for point-to-point messaging and may typically be transport agnostic or transport independent. Extensions to web services, such as, for example, WS-Addressing and WS-Routing, may specify an actual node traversal and node end point routing of web service messaging.

The present invention may provide a system and method for routing a message to multiple end points (terminal nodes) in a tiered hierarchy of, for example, web services in a distributed system and aggregating results from the terminal nodes for sending to a requesting node.

For example, the TSA (Transportation Security Administration) may desire a system for the management and updating of airport scanning equipment (ASE). Currently the TSA has over 12,000 ASE machines deployed in approximately 450 airports nationwide. An exemplary embodiment of the disclosed invention may deliver messages and receive responses from some (or all) of the ASE machines. For example, these messages could contain command information, a command to update configuration information, a query for information, a nationwide search for a bag image that corresponds to an individual customer, or broadcast data messages text messaging of multiple screening equipment operators, and so on. It should be appreciated that these are non-limiting examples and, in general, the message can comprise any type of information, commands, queries, or the like. Furthermore, the disclosed system and method are not limited to ASE machines but are generally applicable to distributed network systems.

An exemplary embodiment of the present disclosure may include a web service that receives a message including a header having a list of destination nodes, or node aliases. Each destination node may correspond to a web service that may be disposed, for example, in a control center or an ASE machine. The list of destination nodes may be included in the message header or the message body. When a node receives the message, the node may route the message to a number of nodes determined by a fan-out of child nodes in a tiered device network arrangement. As used herein, the term "fan-out" refers to child nodes coupled (physically and/or logically) to a node at a logically lower tier in a tiered device network hierarchy. The node receiving the message may divide the list of destination nodes into one or more second lists, for example each second list may contain about an equal portion of destination nodes, corresponding to the number of child nodes specified by the fan-out and forward a modified message including a second list of destination nodes to a child node on each second list. Each child node may repeat a similar process until no routing nodes are left. The end node (or terminal node) then may act on the information, query, data, message or command and provides a response back to the parent node. Also, nodes forwarding the message may act on the service request. Each parent node may aggregate results received from its child nodes and may provide a response to a parent node. When the response reaches the originator (or service requester), it may contain a result set including a result from every node in the original message.

The present invention may include an algorithm implemented in software and/or hardware for efficiently routing messages to a plurality of nodes in a distributed system or network. Each node in the distributed system may be a separate network addressable entity, including, for example, a web service. A list of destination nodes to which the message is addressed may be included in the message itself. The system and method of the present disclosure may route the message in a hierarchical fashion, determining and routing the message to a fan-out of devices (machines, appliances, instruments, computers, or the like). As the message is forwarded, the list of nodes to each of the child nodes may be reduced. Each child device may include similar, or the same, routing capability, so, the child nodes may route the message to a fan-out of their respective child nodes. This process may continue until the number of destination nodes is in the list is less than the number of nodes in the fan-out. The terminal node (and possibly the nodes that route the message) may perform a function to act on the message and provide a reply to the message issuer or service requester. Each parent node aggregates replies from all its child nodes and replies back to its parent nodes, which performs the same operation. After traversing the entire hierarchy, the reply is given to the requester. The disclosed system may include asynchronous responses (for example, a reply indicating that the message was received). The disclosed system and method may also provide for an action to be taken when nodes are not present or not responsive.

BRIEF DESCRIPTION

DETAILED DESCRIPTION

Figure 1:
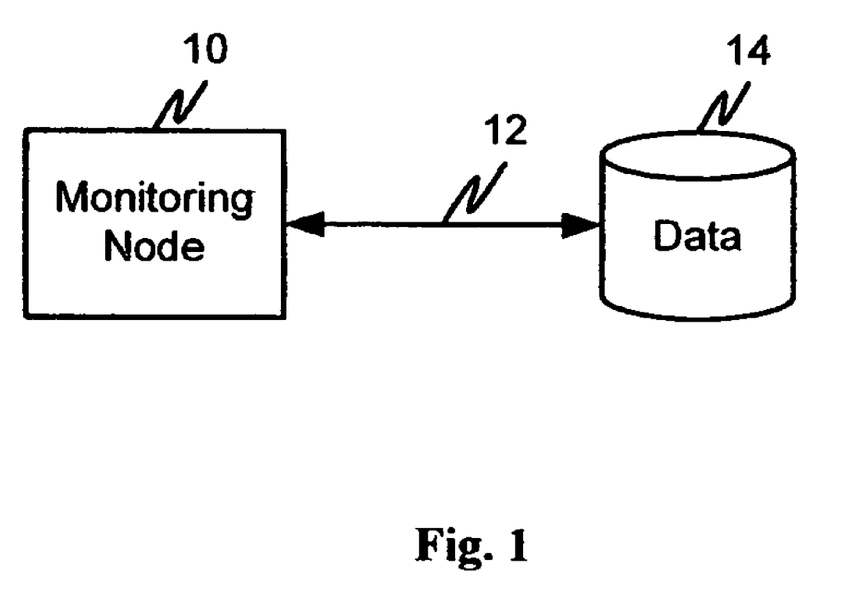
FIG. 1 provides a block diagram representation of an exemplary disclosed monitoring node.
Figure 2:
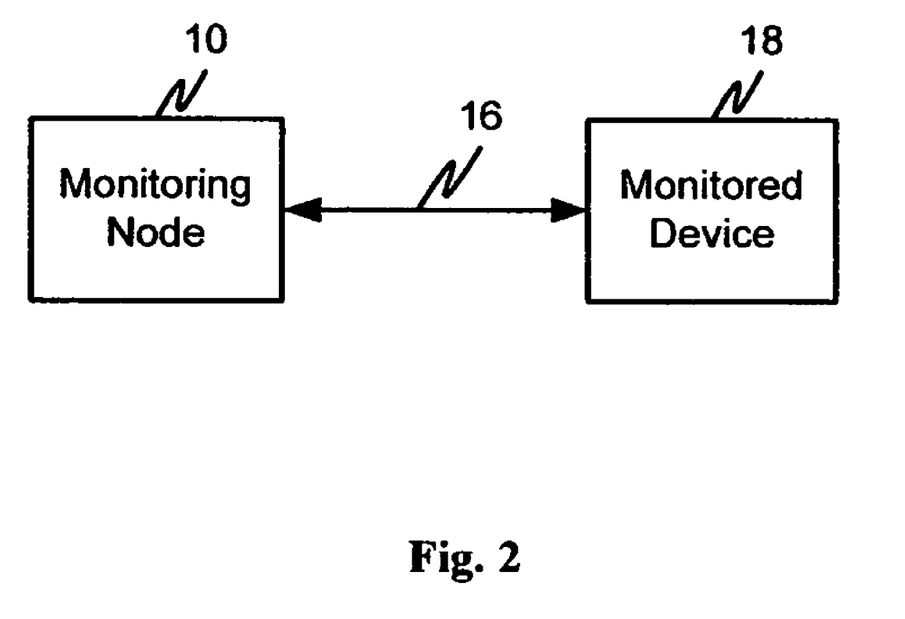
FIG. 2 provides a block diagram representation of an exemplary disclosed monitoring node.

FIG. 1 provides a block diagram representation of an exemplary disclosed monitoring node 10. In particular, a monitoring node 10 is coupled, via a link 12, to a data source 14. FIG. 2 provides a block diagram representation of an exemplary disclosed monitoring node 10 coupled, via link 16, to a monitored device 18. The data source 14 and the monitored device 18 may include a software module (agent, application, service, daemon, routine) on a device to be monitored or on a device having a source of data or information. Alternatively, the data source 14 and the monitored device 18 may include an external computer having network access to a device to be monitored or a device having a source of data or information.

The monitoring node 10, for example, may be used to monitor and control the monitored device 18 or access data and information in the monitored device 18 or data source 14. In operation, the monitoring node 10 may receive a message containing a service request. The monitoring node 10 may retrieve data, store data, or affect an operation of the data source 14 and/or the monitored device 18 in response to the service request. Further, the monitoring node 10 may compose a response message to indicate a status, provide data, or the like and send the response message to a parent node for forwarding to a service requester. The service request message and/or the response message may be composed at least partially in a self-describing computer language. An example of a self-describing computer language is extensible Mark-up Language (XML). Although one monitored device 18 and one data source 14 are shown, it should be appreciated that more or less than one of each may be used.

Figure 3:
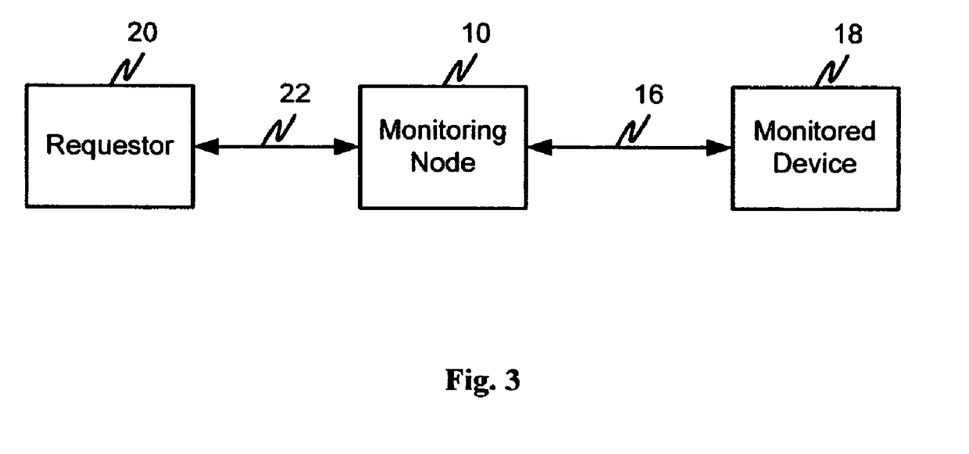
FIG. 3 provides a block diagram representation of an exemplary disclosed monitoring node associated with a requestor node.

FIG. 3 provides a block diagram representation of an exemplary disclosed monitoring node 10. In particular, a requestor 20 may be coupled, via link 22, to the monitoring node 10, and a monitored device 18 may be coupled to the monitoring node 10 via a link 16. In operation, a user (e.g., a physical user, or a computer system or software program) may send a request for a service to the monitoring node 10. The monitoring node 10 may act on the request and respond to the request with information and or status. For example, a user may issue a request message from the requester system 20. The request message may contain a list of intended recipient nodes including the monitoring node 10. The request message may also contain a request for a particular service. The disclosed routing system and/or method may be used to route the message to the monitoring node 10. The monitoring node 10 may receive the message and determine from the list of destination nodes that it is an intended recipient of the message and may act on the message based on the request. The request may include exchanging data, control signals, and/or status messages with the monitored device 18.

Figure 4:
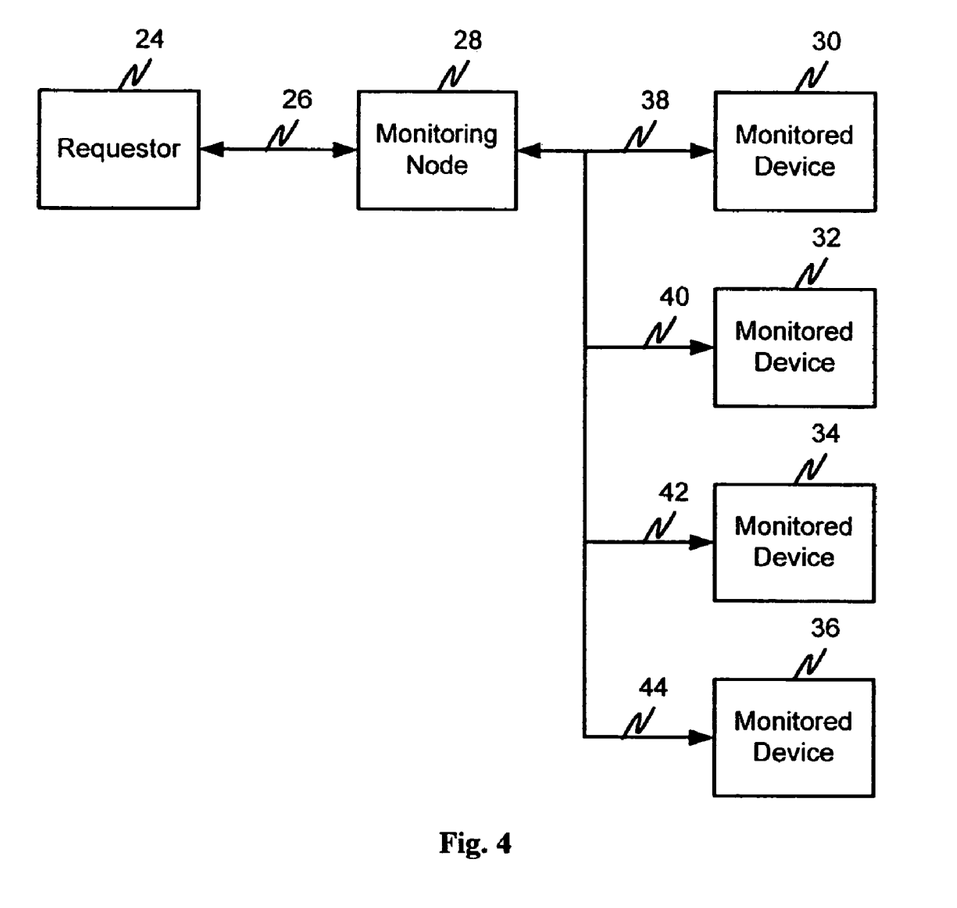
FIG. 4 provides a block diagram representation of an exemplary disclosed monitoring node associated with a requester and a plurality of monitored devices.

FIG. 4 provides a block diagram representation of an exemplary disclosed monitoring node associated with a requestor and a plurality of monitored devices. In particular, a requestor node 24 may be coupled via a link 26 to a monitoring node 28. The monitoring node 28 may be coupled, in turn, to a plurality of monitored devices (30-36) via links (38-44), respectively. Each monitoring node may be configured to monitor a certain number of devices. The number of devices that can be monitored may be practically limited due to network bandwidth and computing resources available on the monitoring node 28. The number of devices that may be controlled by a monitoring node is referred to herein as the fan-out. For example, FIG. 4 shows the monitoring node 28 having a device fan-out of four (i.e., the monitoring node 28 is coupled to four monitored devices (30-36)).

In operation, request messages and response messages are sent from the service requestor node 24 to the monitoring node 28 via link 26. Data, control signals, and/or status messages are sent between the monitoring node 28 and each of the monitored devices (30-36), via the links (38-44), respectively.

A user (whether a physical user, a server that communicates to a user, or a computer system) may also be in direct contact and/or direct control of a limited number of nodes due to network bandwidth and available computing resources. A particular node fan-out may reflect the computing power of the requestor system and the network bandwidth.

Figure 5:
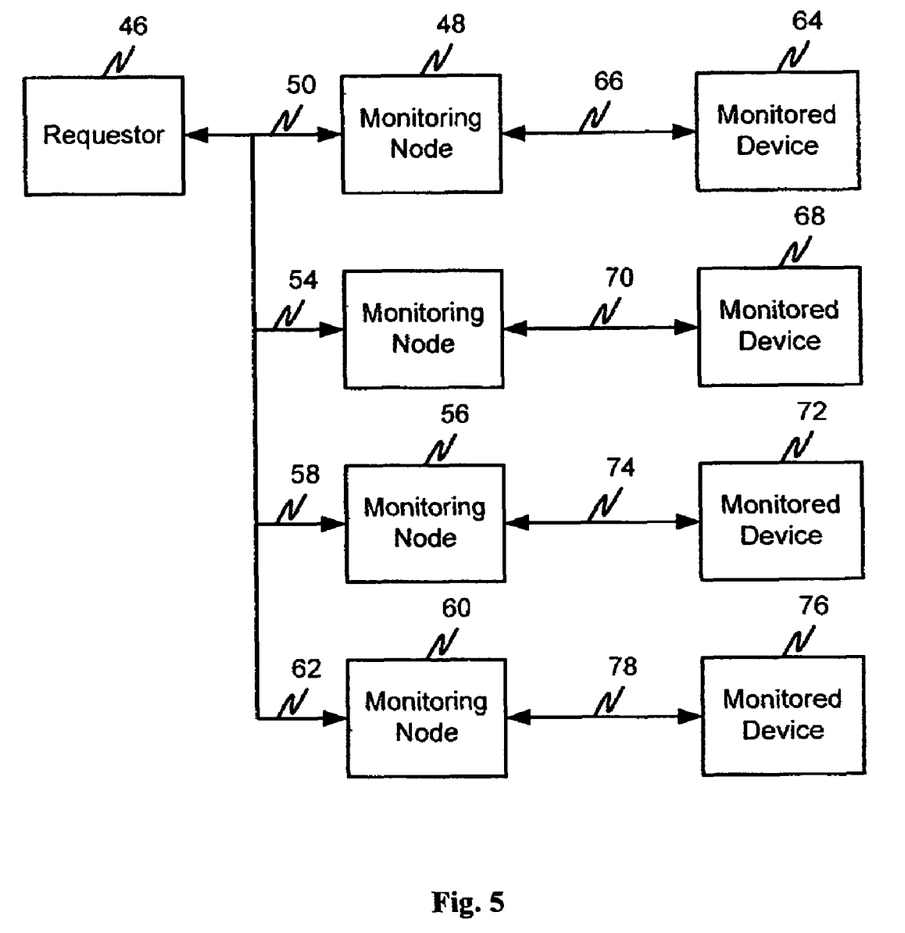
FIG. 5 provides a block diagram representation of a plurality of exemplary disclosed monitoring nodes associated with a requester and a plurality of monitored devices.

FIG. 5 provides a block diagram representation of a plurality of exemplary disclosed monitoring nodes associated with a requestor and a plurality of monitored devices. In particular, a requestor node 46 is coupled to four monitoring nodes (48, 52, 56, and 60) via links (50, 54, 58, and 62). The monitoring nodes (48, 52, 56, and 60) may be coupled to four monitored devices (64, 68, 72, and 76) via links (66, 70, 74, and 78).

In this exemplary embodiment, the requestor 46 may send a message to one or more of the monitoring nodes (48, 52, 56, and 60). The monitoring nodes may, in turn, forward the message to one or more of the monitored devices (64, 68, 72, and 76), where the forwarding may be based on the list of destination nodes included in the message.

Figure 6:
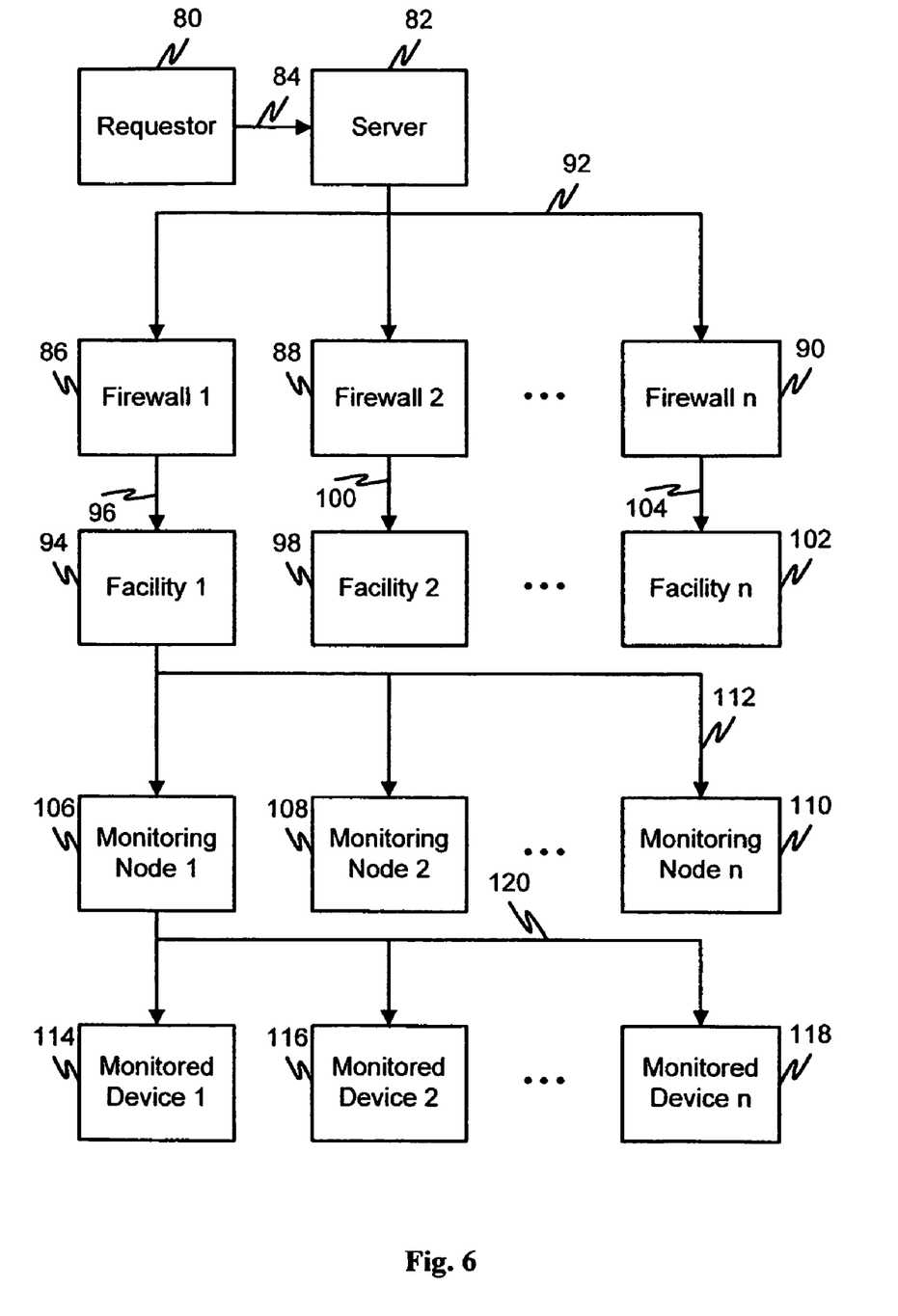
FIG. 6 provides a block diagram representation of an exemplary disclosed distributed network.

FIG. 6 provides a block diagram representation of an exemplary disclosed distributed network. In particular, the network may include a requester 80, a server 82, a link 84, a plurality of firewalls (86-90), a link 92, a plurality of facility nodes (94, 98, and 102), a plurality of links (96, 100, and 104), a plurality of monitored nodes (106, 108, and 110) a link 112, a plurality of monitored devices (114, 116, and 118), and a link 120. The requestor 80 may be coupled to the server 82 via the link 84. Each of the firewalls (86-90) may be coupled to the server 82 via the link 92. Each of the plurality of facility nodes (94, 98, and 102) may be coupled the firewalls (86-90) via the links (96, 100, and 104). The facility node ("Facility 1") 94 may be coupled to the plurality of monitored nodes (106, 108, and 110) via the link 112. The monitoring node ("Monitoring Node 1") 106 may be coupled to the plurality of monitored devices (114, 116, and 118) via the link 120. The links may each be a wired or wireless link, such as, for example, a private or public network connection. Further, the links may comprise an internal or external network. It should be appreciated that the distribute network of FIG. 6 is shown with few nodes for simplicity and clarity of illustration and that more or less nodes may be used depending on a contemplated use of the invention.

For example, each commercial airport may comprise a plurality of different security devices, such as threat scanning machines. Nationally, or internationally, there may be thousands of security devices that may need to be monitored and/or controlled. An exemplary embodiment of the present invention may include a central web server to manage the communication to a tiered network of threat scanning machines. A multi-tiered approach to logically or physically arranging the distributed network may be used. A message may be received by devices in a first tier (e.g., the facility nodes 94, 98, and 102). The messages received by the tier one nodes may be forwarded to the tier two nodes (e.g. the monitoring nodes 106, 108, and 110). Also, the first tier nodes (the facility nodes 94, 98, and 102) may process the request contained in the message for any monitored devices coupled to the first tier nodes. The tier two nodes (106, 108, and 110) may forward the request message to the monitored devices (114, 116, and 118) and await a response. When all response messages are received by tier two nodes from the monitored devices, the responses may be aggregated into a single reply that may be forwarded up the tiered hierarchy to the server 82 for forwarding to the requestor 80.

In another example, assuming a fan-out of one hundred nodes, a request message for ten thousand monitoring nodes may be processed. In this example, a server may only communicate with 100 nodes to receive the response from 10,000 nodes (each node may monitor and control many TSMs).

The "tiering" of nodes may allow the number of nodes or devices to be extended, thus allowing for the monitoring of any number of devices and nodes. The tiered approach may also provide for distributed storing of information at the device and node level because a service may include querying multiple site databases and receiving an aggregated response. The tiered approach may also provide for real time control and communication with any device or node throughout the system.

The routing management systems and methods of the present invention may address which nodes route which messages to which other nodes, and what happens if one node doesn't respond. For example, if one node doesn't respond within a certain time period, any response message being aggregated by the parent node may be forwarded up the hierarchy without further delay. Also, the non-responsive node may be removed from future destination node lists until communications with the non-responsive node can be re-established. In one exemplary embodiment, a fixed hierarchy of nodes may be controlled by a configuration file. For instance, one node may be the parent node of all others. The node hierarchy could be read from a configuration file including which nodes are child nodes. In a preferred embodiment, the network may be configured dynamically.

Figure 7:
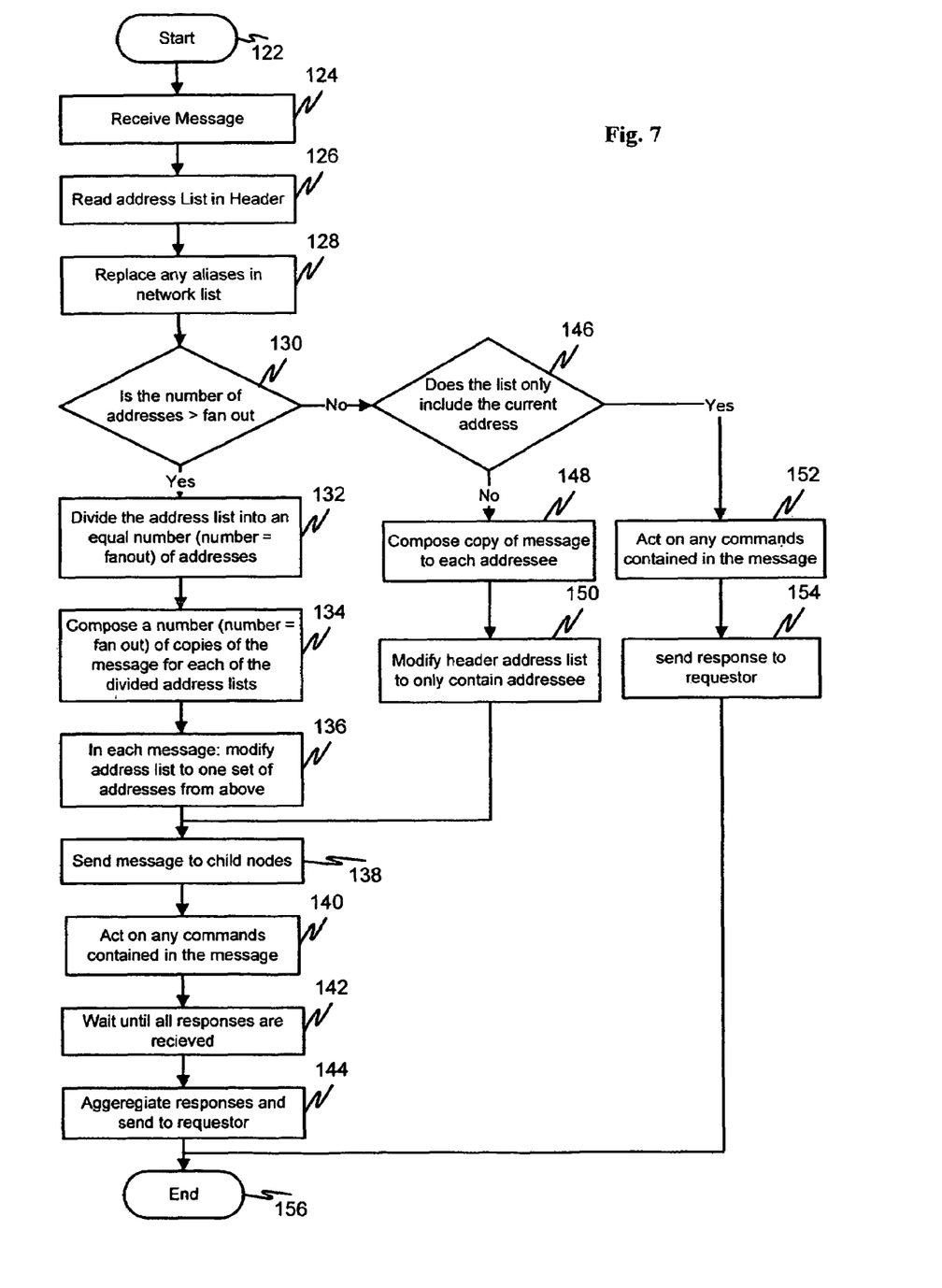
FIG. 7 provides a flowchart representation of an exemplary embodiment of a disclosed method for routing information in a distributed network.

In an exemplary embodiment, the header of each message may include a list of destination nodes that the message should be delivered to. FIG. 7 provides a flowchart representation of an exemplary embodiment of a disclosed method of managing information in a distributed network. In particular, the first step after start (step 122) may include receiving a message (step 124) containing a list of destination nodes. This message can be received by any node in the system that may be "network accessible" to the user or sender of the message. By providing a list of destination nodes within each message, the disclosed routing method may determined by each node. In an exemplary embodiment, the present invention may include a plurality of nodes. Each node may provide: status and control of itself, status and control to a monitored device, and/or access to remote data on a monitored device.

The list of destination nodes contained in the message header may be read by a receiving node (step 126). Any aliases in the destination list may be resolved and replaced with actual network addresses (step 128). If the list contains more nodes than the fan out of the device (conditional step 130), the address list may be divided into a number of lists equal to the number of nodes in a fan-out (step 132) from the receiving node. A number of modified messages may be composed, the number corresponding to the fan-out. The divided destination node lists may be copied into individual messages (step 134 and 136) and routed to the first address on each of the new list of the messages (step 138). If the message contains a list of destination nodes greater than one but less than the fan-out (conditional step 146), the message may be copied (step 148), the address list of each copied message may be modified to contain one address (step 150) and the new message may be routed to that address (step 138). The node may service the requests by acting on any commands contained in the service request (step 140) and may wait for a response from child nodes (142). Any responses received may be aggregated together and may be sent to the requester (step 144), after which the method ends (step 156). It should be appreciated that the method illustrated in the flowchart of FIG. 7 may be repeated as may be needed to process received messages. Further, the disclosed systems and methods may be implemented in one or more modules comprising hardware, software, and/or a combination of the above. While preferably contained in a single software module, an embodiment of the disclosed systems and/or methods may be distributed across one or more modules or processors.

Figure 8:
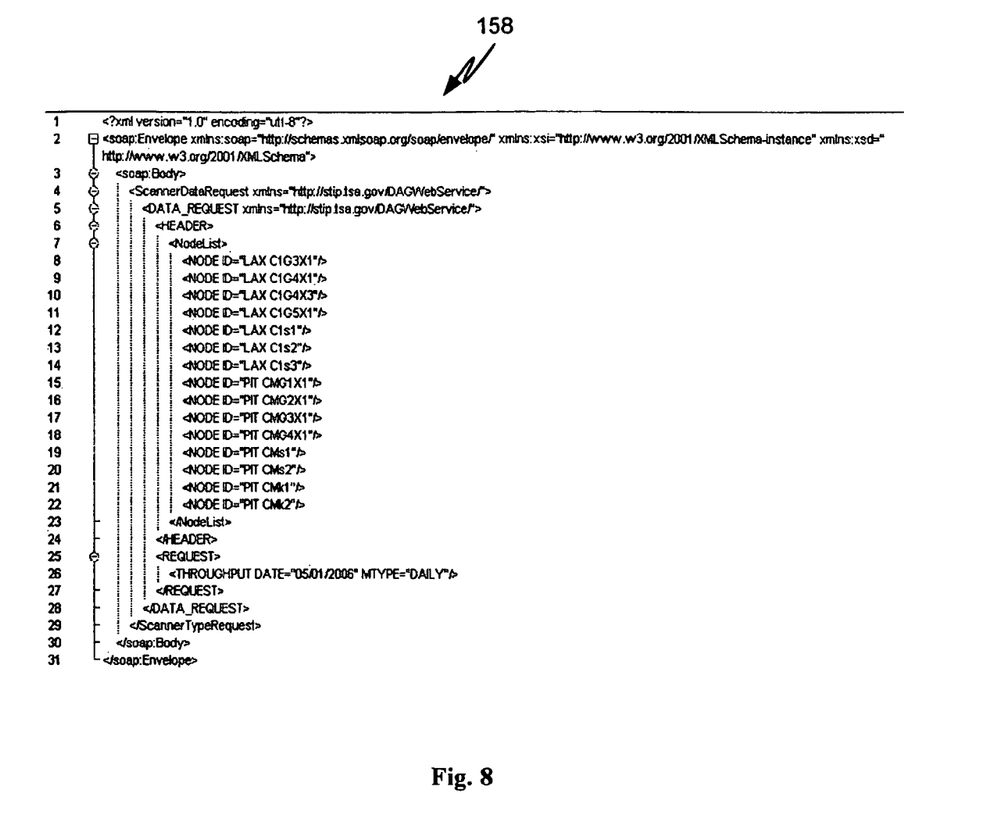
FIG. 8 provides an exemplary message in accordance with the disclosed system and method for routing information in a distributed network.

It should be appreciated that the actual address list in the message header may include either network names or aliases. Network names can differ from one side of a firewall to another. Therefore, a domain name server may not "know" the network address of a device behind a firewall and an alias may be used to indicate addresses behind a firewall. In an exemplary embodiment, a monitored node may include a configuration file to indicate where to route aliases that begin with certain key letters. For example, the node identifiers on lines 8 through 22 may include aliases. In this example, the destination node aliases that begin with "LAX" (lines 8-14) would be routed to LAX airport, while the destination node aliases beginning with "PIT" (lines 15-22) would be routed to Pittsburg airport. When routed through the firewall at the airports a node, such as the facility node or monitored node may replace these aliases with real network addresses.

It should be appreciated that the system and method of the present disclosure may be implemented using XML web services and/or using Simple Object Access Protocol (SAOP) messages delivered through Hypertext Transfer. Protocol (HTTP). The SOAP messages may traverse a firewall. System messages may include WS-Security to encrypt those portions of the message where encryption may be desired. Authentication may be accomplished through 509 Security Certificates to establish private and public keys.

The authentication module may include an authentication module implemented in software and/or hardware. The authentication module may include a mechanism of authentication permitting other nodes or modules to know and trust other nodes, a capability of restricting access to network access, nodes, and/or services by user, group, or calling address.

A configuration algorithm to configure an interface may include functions for adding new nodes to the network, configuring authentication access, configuring an aggregation function, adding additional functions, configuring routing and fan-in or fan-out, and/or the like. A routing module may include routing messages to an appropriate level of "fan-out". An aggregation module may be provided to aggregate responses into a single response to the sender. A message delivery module may be provided to determine when nodes may be unavailable and/or unresponsive, and take appropriate action.

For example, assuming a need to query thirteen thousand nodes each having a fan-out of 10. An embodiment of the disclosed system may effectively process ten web service requests in parallel by sending the request to the ten nodes in the fan-out. Thus, with five sequential web service calls, each simultaneously calling ten nodes, results may be obtained and aggregated from thirteen thousand nodes.

In another exemplary embodiment, response data may be staged in one or more databases within a distributed system, and the database may be queried directly for the response data. This approach could be utilized in at least the ASE environment. Using an approach that allows data to be queried effectively from the ASE may allow less centralized data staging and data replication at a centralized control center.

As shown in the above figures, the disclosed information routing and management system and method can be implemented on one or more of a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, a router or switch, or the like. In general, any componentry capable of implementing the functions described herein can be used to implement the system and methodology according to this invention.

Furthermore, the disclosed system and method may be readily implemented in software using object or object-oriented software development environments that provide portable source code that can be used on a variety of computing platforms. Alternatively, the disclosed system and method may be implemented partially or fully in hardware using standard logic circuits or a very large-scale integration (VLSI) design. Other hardware or software can be used to implement and supplement the systems in accordance with this invention depending on the speed and/or efficiency requirements of the system, the particular function, and/or a particular software or hardware system, microprocessor, networking, or microcomputer system being utilized. The system and method illustrated herein can readily be implemented in hardware and/or software using any known or later developed systems or structures, devices and/or software by those of ordinary skill in the applicable art from the functional description provided herein and with a general basic knowledge of the computer and network communication arts.

Moreover, the disclosed system and method may be readily implemented in software executed on programmed general-purpose computer(s), a special purpose computer, a microprocessor, or the like. In these instances, the systems and methods of this invention can be implemented as a program embedded on personal computer such as JAVA® or Common Gateway Interface (CGI) script, as a resource residing on a server or graphics workstation, as a routine embedded in a dedicated network system, or the like. The system can also be implemented by physically incorporating the system and method into a software and/or hardware system, such as the hardware and software systems of a network.

It is, therefore, apparent that there is provided in accordance with the present invention, systems and methods for managing information routing and distribution in a distributed networked environment. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. An information management method for a device network, the method comprising:

analyzing a service request message at a receiving node, the service request message including a first list of one or more destination nodes to which the message is addressed and a service request;

if the first list represents a number of destination nodes greater than a number of child nodes in a fan-out, generating a plurality of modified messages corresponding to the number of child nodes in the fan-out and including a second list of one or more child nodes, the second list of destination nodes representing a portion of the first list of destination nodes, the modified message being addressed to a destination node in the second list of destination nodes to which the modified message is addressed;

otherwise, if the first list contains one or more destination nodes in addition to the receiving node, generating a plurality of modified messages corresponding to the number of destination nodes in the first list and including a second list of at least one child node, the second list of destination nodes representing a child node to which the modified message is addressed;

forwarding the modified message, if any, to child nodes on the second list;

acting on the service request;

waiting on a response from each child node in the fan-out where a modified message has been forwarded;

aggregating responses from child nodes into a single response message; and forwarding the single response message to a service requestor.

2. The information management method of claim 1, wherein the device network is a network of airport threat scanning machines.

3. The information management method of claim 1, wherein the service request message includes extensible mark-up language.

4. The information management method of claim 1, wherein the service request message includes simple object access protocol.

5. The information management method of claim 1, wherein the at least one of the one or more destination nodes is a web service.

6. The information management method of claim 1, wherein the first list is disposed in a header of the service request message.

7. The information management method of claim 1, further comprising aggregating response messages into a database.

* * * * *